Jan. 7, 1941. D. J. HINSON 2,227,750
VEHICLE JACK
Filed Sept. 21, 1939
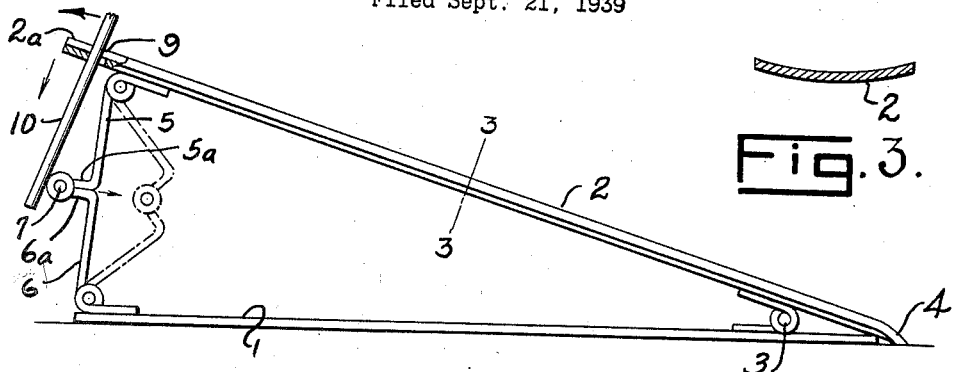
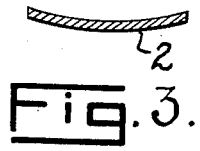
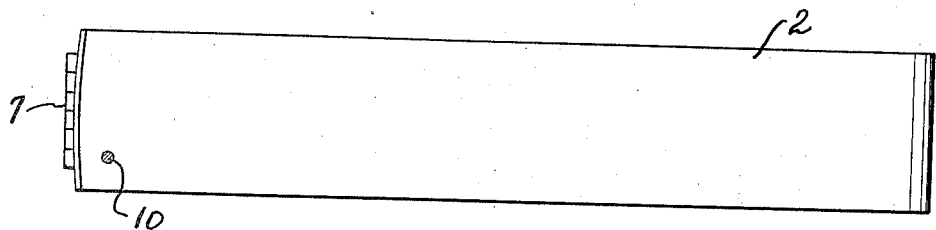
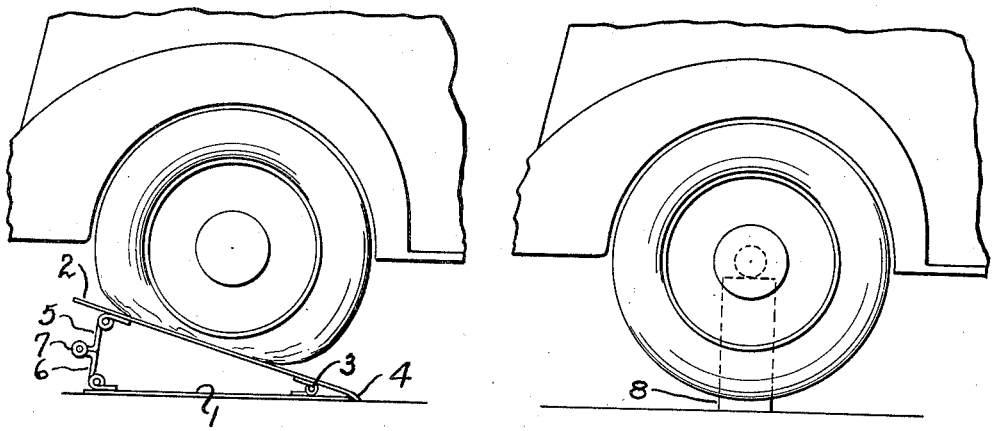
INVENTOR.
DAVIS J. HINSON
BY E. V. Hardway,
ATTORNEY.

UNITED STATES PATENT OFFICE 2,227,750

VEHICLE JACK

Davis J. Hinson, Houston, Tex., assignor of one-half to W. E. Loocke, Harris County, Tex.

Application September 21, 1939, Serial No. 295,890

1 Claim. (Cl. 254—88)

This invention relates to a vehicle jack.

An object of the invention is to provide an implement whereby a wheel of a vehicle may be elevated off of the ground surface without effort on the part of the operator and by utilizing the motive power of the vehicle itself.

Motor vehicles, particularly passenger automobiles, are at the present time so constructed that it is very difficult to use the ordinary jack for elevating a wheel in order to remove a deflated tire. The type of jack herein described may be positioned either in front of, or at the rear of, the wheel to be elevated and the wheel then moved up an inclined plane, by an appropriate movement of the vehicle, so as to give the wheel the desired elevation and to permit the insertion of a supporting post to support the wheel in elevated position after the jack has been collapsed and removed.

It is another object of the invention to provide a very simple type of jack comprising a base and an inclined track hinged to the base with novel means for supporting the track in elevated or active position and which may be collapsed so as to occupy small space, for easy transportation, when not in use.

With the above and other objects in view the invention has particular relation to certain novel features of construction, arrangement of parts and use, an example of which is given in this specification and illustrated in the accompanying drawing, wherein:

Figure 1 shows a side view of the jack in active position and shown partly in section.

Figure 2 shows a top plan view.

Figure 3 shows a sectional view taken on the line 3—3 of Figure 1.

Figure 4 shows a side view of the jack in active position, supporting the wheel of a vehicle, and Figure 5 shows the supporting post in place under the vehicle axle and the jack removed.

Referring now more particularly to the drawing wherein like numerals of reference designate the same parts in each of the figures, the numeral 1 designates a base preferably formed of a flat metal plate approximately rectangular in shape. The numeral 2 designates a track which is also preferably formed of a metal plate substantially rectangular in plan view and which is concavo-convex transversely with the convex side upwardly as illustrated in Figure 3.

At one end the plate and track are hinged together by means of the hinge 3. The hinge is spaced inwardly a short distance from the corresponding ends of the base and track and the end of the track is extended slightly beyond the corresponding end of the base and downwardly turned as at 4. The other ends of the base and track are connected by the upper and lower toggle levers 5, 6 which are hinged to the track and base, respectively, at one end and whose other ends are hinged together. The adjacent ends of the toggle levers have the outwardly turned portions 5a, 6a whose free ends are connected together by the hinge 7.

When the track is in inclined, or active position, the toggle levers 5, 6 will be in substantial alignment as shown in Figures 1 and 4 with the hinge 7 positioned outwardly or off center as also shown in Figures 1 and 4. With the jack in said active position shown in Figure 1 it may be positioned in front of or behind the wheel having the deflated tire and the vehicle then moved to roll the wheel up the track 2 until it is sufficiently elevated to permit the insertion of the supporting post 8 in position underneath the vehicle axle. The jack may then be collapsed and removed and the wheel thus supported in elevated position to maintain the tire clear of the ground surface. In collapsing the jack, after the post has been inserted into place, the hinge 7 may be forced inwardly in the direction indicated by the arrow in Figure 1 and when it has passed center the toggle levers 5, 6 will readily collapse permitting the track 2 to drop onto the base into collapsed position. In case the load on the jack is unusually heavy it may be difficult to easily collapse the jack. For that reason the upper end 2a of the track 2 has been extended and provided with an opening 9 to receive a lever 10 which may be inserted through said opening with one end resting against the outer side of the hinge 7. Thereupon the upper or long end of the lever may be pulled in the direction of the arrow shown in Figure 1 and the toggle levers 5, 6 thereby easily forced inwardly to permit collapsing of the jack.

The drawing and description are illustrative merely, while the broad principle of the invention will be defined by the appended claim.

What I claim is:

A vehicle jack comprising a flat base, a track one end of which is hinged to one end of the base, toggle levers each being hinged, at one end, to the base and track, respectively, the other ends of the toggle levers being outwardly turned at approximately right angles, the free ends of said outwardly turned portions being hinged together, the free end of the track being extended beyond its corresponding toggle levers and provided with an opening, a lever positioned in the opening and contacting the hinge portion of said toggle levers, which is effective upon oscillation to rotate said levers to allow the track to be lowered.

DAVIS J. HINSON.